United States Patent
Kurnik et al.

(10) Patent No.: US 9,390,569 B2
(45) Date of Patent: Jul. 12, 2016

(54) CONTROL AND DIAGNOSIS OF A CONTROLLER WAKE UP FEATURE

(71) Applicant: GM GLOBAL TECHNOLOGY OPERATIONS LLC, Detroit, MI (US)

(72) Inventors: James T. Kurnik, Linden, MI (US); Michael A. Turley, Dexter, MI (US); John F. Van Gilder, Webberville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 46 days.

(21) Appl. No.: 14/280,418

(22) Filed: May 16, 2014

(65) Prior Publication Data

US 2015/0332526 A1 Nov. 19, 2015

(51) Int. Cl.
*G01M 17/00* (2006.01)
*G06F 7/00* (2006.01)
*G06F 19/00* (2011.01)
*G07C 5/08* (2006.01)

(52) U.S. Cl.
CPC .............. *G07C 5/0808* (2013.01); *G07C 5/085* (2013.01)

(58) Field of Classification Search
CPC . F16H 61/12; F16H 59/40; F16H 2061/1208; G01D 3/08; G01D 18/004; G05B 23/02; G05B 23/0283; B60W 50/0205; G07C 5/085; G07C 5/008; G07C 5/0808
USPC ................................................ 701/31.1–31.9
See application file for complete search history.

(56) References Cited

U.S. PATENT DOCUMENTS

| | | | |
|---|---|---|---|
| 8,713,108 B2 * | 4/2014 | Naito | G01C 21/005 709/206 |
| 2003/0109972 A1 * | 6/2003 | Tak | G06Q 10/02 701/31.4 |
| 2010/0127857 A1 * | 5/2010 | Kilmurray | G06F 1/3212 340/540 |
| 2012/0079873 A1 | 4/2012 | Jackson et al. | |

* cited by examiner

*Primary Examiner* — Maceeh Anwari
(74) *Attorney, Agent, or Firm* — Ingrassia Fisher & Lorenz, P.C.

(57) ABSTRACT

A control and diagnosis methodology for an electronic module of a vehicle is presented here. In accordance with the disclosed method, at least one wake up event for a processor of the electronic module is performed during an inactive shutdown state of the vehicle. The at least one wake up event is initiated by a wake up timer of the electronic module. The method continues by logging, during the inactive shutdown state of the vehicle, wake up information associated with the at least one wake up event to obtain logged wake up information. The logged wake up information is analyzed during an active operating state of the vehicle to obtain a wake up diagnosis, and the method generates, during the active operating state of the vehicle, an output indicative of the wake up diagnosis.

18 Claims, 6 Drawing Sheets

CONTROL AND DIAGNOSIS OF A CONTROLLER WAKE UP FEATURE

TECHNICAL FIELD

Embodiments of the subject matter described herein relate generally to electronic control and diagnostic systems of the type used in vehicles. More particularly, embodiments of the subject matter relate to the control and diagnosis of a wake up feature for an onboard electronic control unit.

BACKGROUND

Modern vehicles include many electronic and processor-based subsystems that carry out a variety of operations. The prior art includes electronic control units (ECUs) that can be used to perform various control schemes, diagnostic routines, and other processes related to the operation of vehicles. A vehicle such as an automobile may include an ECU that is programmed to perform diagnostic checks on other onboard subsystems. Some diagnostic checks may be performed while the vehicle is in an active operating state, and other diagnostic checks may be performed during periods of inactivity, e.g., while the vehicle is shut down. In this regard, embedded controllers may be designed to wake themselves up (via an onboard timer) to monitor certain vehicle systems during vehicle shut-down periods.

Accordingly, it is desirable to have a technique and methodology to diagnose the operation of a controller wake up feature in an accurate and energy efficient manner. Furthermore, other desirable features and characteristics will become apparent from the subsequent detailed description and the appended claims, taken in conjunction with the accompanying drawings and the foregoing technical field and background.

BRIEF SUMMARY

An exemplary embodiment of a control and diagnosis method for an electronic module of a vehicle is provided. The method performs, during an inactive shutdown state of the vehicle, at least one wake up event for a processor of the electronic module, wherein the at least one wake up event is initiated by a wake up timer of the electronic module. The method continues by logging, during the inactive shutdown state of the vehicle, wake up information associated with the at least one wake up event. The logged wake up information is analyzed during an active operating state of the vehicle to obtain a wake up diagnosis. The method continues by generating, during the active operating state of the vehicle, an output indicative of the wake up diagnosis.

An exemplary embodiment of an electronic control module for a vehicle is also provided. The electronic control module includes a processor, a wake up timer operatively associated with the processor, and a nonvolatile memory element configured to store wake up request information associated with wake up requests managed by the processor. The processor, the wake up timer, and the nonvolatile memory element cooperate to perform, during an inactive shutdown state of the vehicle, at least one wake up event for the processor, the at least one wake up event being initiated by the wake up timer. During the inactive shutdown state of the vehicle, a wake up history array is maintained; the array includes at least one entry associated with the at least one wake up event. The wake up history array is analyzed during an active operating state of the vehicle to obtain a wake up diagnosis. During the active operating state of the vehicle, an output is generated; the output is indicative of the wake up diagnosis.

Also provided is an exemplary embodiment of a control and diagnosis method for an electronic module of a vehicle. The electronic module includes a processor and a wake up timer. The method operates the wake up timer during an inactive shutdown state of the vehicle to initiate wake up events for the processor. The method continues by operating the processor during the wake up events to perform vehicle diagnostics, manage wake up requests, and log wake up information associated with the wake up events. The method performs, during an active operating state of the vehicle that follows the inactive shutdown state of the vehicle, wake up diagnostics based on logged wake up information. The method continues by generating, during the active operating state of the vehicle, a result of the wake up diagnostics.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium (e.g., a non-transitory medium) such that stored instructions are capable of performing the described functions when the instructions are executed. Examples of a processor-readable medium include an electronic circuit, a semiconductor memory device, a ROM, a flash memory, an erasable ROM (EROM), a floppy diskette, a CD-ROM, an optical disk, a hard disk, or the like.

Figure 1:
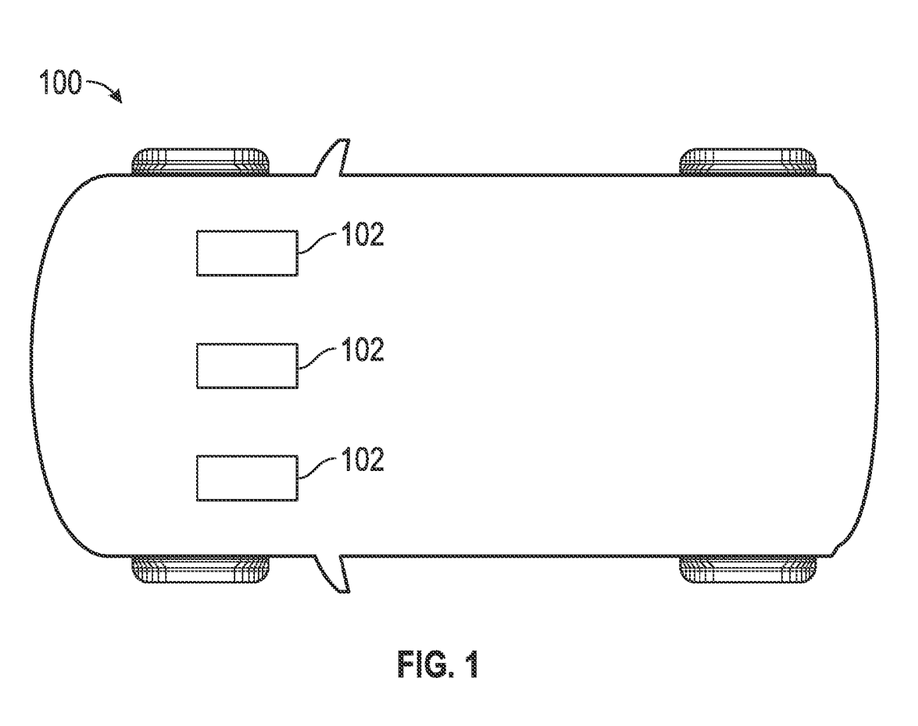
FIG. 1 is a simplified schematic representation of a vehicle that utilizes electronic control units (ECUs)

FIG. 1 is a simplified schematic representation of a vehicle 100 that includes at least one onboard electronic control unit (ECU) 102. Although the vehicle 100 is depicted with three ECUs 102, any number may be deployed to suit the needs of the particular embodiment. In certain embodiments, an ECU 102 may be suitably configured to function as a body control module, an engine control module, a powertrain control module, or the like. The following description refers to certain control and diagnostic operations associated with an engine control module. In practice, however, the control and diagnostic operations described here could be performed by any ECU onboard the vehicle 100.

Figure 2:
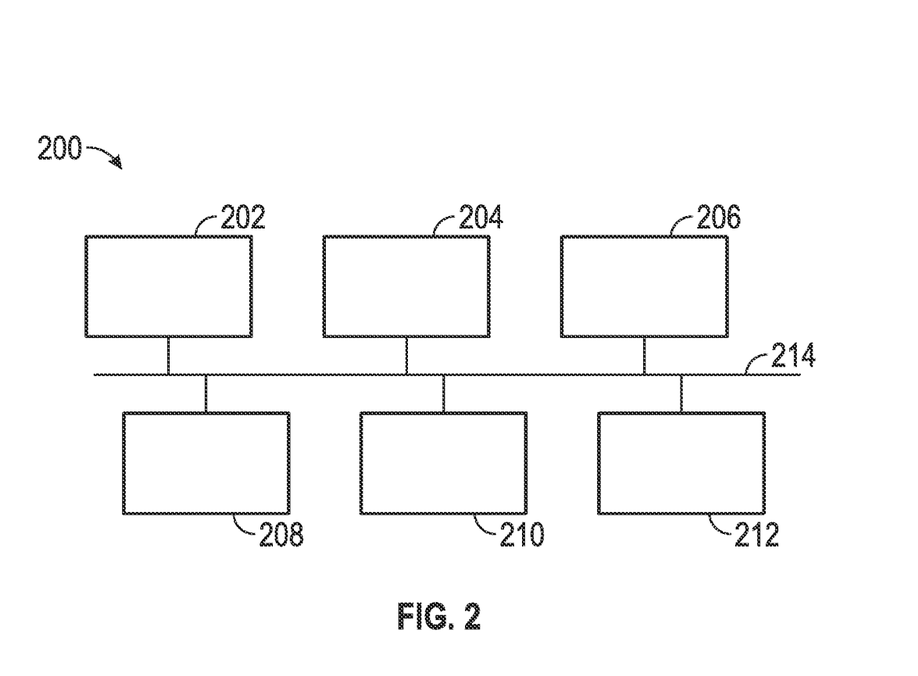
FIG. 2 is a block diagram representation of an exemplary embodiment of an ECU.

FIG. 2 is a block diagram representation of an exemplary embodiment of an ECU 200. Each of the ECUs 102 shown in FIG. 1 may be configured in accordance with that shown in FIG. 2. The illustrated embodiment of the ECU 200 generally includes, without limitation: a processor 202; a wake up timer 204; memory 206; one or more input/output interfaces 208; one or more communication modules 210; and a power supply 212. The elements of the ECU 200 may be coupled together via any suitable interconnection architecture 214 that accommodates signal and data communication.

The processor 202 may be implemented or performed in a variety of different ways as appropriate to the particular embodiment. For example, the processor 202 may be realized using a general purpose microprocessor, a content addressable memory, a digital signal processor, an application specific integrated circuit, a field programmable gate array, any suitable programmable logic device, discrete gate or transistor logic, discrete hardware components, or any combination designed to perform the functions described here. Moreover, the processor 202 may be implemented as a combination of computing devices, e.g., a combination of a digital signal processor and a microprocessor, a plurality of microprocessors, one or more microprocessors in conjunction with a digital signal processor core, or any other such configuration. For this particular example, the processor 202 is realized as an electronic device package or integrated circuit chip that can be placed into an inactive, sleeping, or powered-down state by removing its operating voltage. Reasserting the operating voltage causes the processor 202 to transition back to its active, awake, and powered-up state.

The processor 202 represents the primary logical and processing component of the ECU 200. Accordingly, the processor 202 is suitably configured to carry out various features, functions, and processes that may be required to support the operation of the host vehicle. For example, if the ECU 200 is deployed as the engine control module of the vehicle, then the processor 202 may be responsible for electronic control and diagnostic operations associated with various engine, ignition, and fuel systems. When awake, the processor 202 may perform diagnostic checks on one or more other vehicle subsystems, whether or not the engine of the vehicle is turned on or off. For example, the processor 202 could be designed to check the status of a battery subsystem or a fuel subsystem while the vehicle is parked. As described in more detail below, the wake up timer 204 wakes up the processor 202 as needed such that the processor 202 can perform such diagnostic checks before shutting itself down (going back to sleep).

The wake up timer 204 may be realized as a separate component or integrated circuit chip that is operatively associated with the processor 202. In certain embodiments, the wake up timer 204 is implemented as a hardware timer that keeps track of a running count while the vehicle is in an engine-off state. Moreover, the wake up timer 204 can be programmed or otherwise set to keep track of wake up times for the processor 202. To this end, the wake up timer 204 may be considered to be an "always on" component that remains operational regardless of the engine-on or engine-off state of the vehicle, and regardless of the power-up or power-down state of the processor 202. As explained in more detail below, if programmed with a wake up time setting, the wake up timer 204 initiates a wake up event to wake the processor 202 up at the programmed time. In certain embodiments, the wake up event is initiated by applying operating power (voltage) to the processor 202 such that the processor 202 can perform the desired tasks and processes.

The memory 206 may be realized using any number of components, and using any type of memory technology (as appropriate for the particular embodiment). Thus, the memory 206 may include, without limitation: RAM memory, flash memory, EPROM memory, EEPROM memory, registers, a hard disk, a removable disk, a CD-ROM, or any other form of storage medium known in the art. In this regard, the memory 206 can be coupled to the processor 202 such that the processor 202 can read information from, and write information to, the memory 206. In the alternative, some of the memory 206 may be integral to the processor 202. As an example, the processor 202 and memory 206 may reside in an ASIC.

For this embodiment of the ECU 200, the memory 206 includes a nonvolatile memory element that is utilized to store wake up request information associated with wake up requests that are managed by the processor 202. The nonvolatile memory element retains its stored data in the absence of operating power/voltage, such that the wake up request information is preserved regardless of the operating state (powered-up or powered-down) of the processor 202. As explained in more detail below, the stored wake up request information is used to populate a wake up history array that serves as a log of wake up events.

The input/output interfaces 208 can be used for operating voltage, sensor signals, and the like. Similarly, the communication modules 210 can be used for data communication, networking, and the like. In practice, the input/output interfaces 208 and the communication modules 210 may cooperate with other ECUs onboard the vehicle and/or for communication with other subsystems onboard the vehicle.

The power supply 212 may include a voltage regulator, power conditioning components, and/or other elements that provide one or more operating voltages to the devices and electronic components of the ECU 200. For example, the power supply 212 provides the operating voltage for the processor 202 and the wake up timer 204. The wake up timer 204 may be suitably configured to control access to the power supply 212 as needed to power up and power down the processor 202 (i.e., to wake up and shut down the processor 202 in the manner described in more detail below).

The subject matter presented here relates to a method for control and diagnosis of a wake up feature for an embedded controller, such as the processor 202 of the ECU 200. The wake up feature may be used to initiate diagnostic checks onboard the vehicle. Accordingly, the wake up times are monitored to ensure that the processor 202 is waking up as expected. The system described here arbitrates the desired wake up time from a multitude of requestors, and monitors the wake up events that occur to ensure that they are occurring properly. The methodology described here collects wake up requests from other subsystems, and sets the next wake up time before the controller is completely shut down. A diagnostic is run to monitor the correctness of each wake up event; the diagnostic may be initiated at the next vehicle power up state. Moreover, the wake up timer itself can be monitored for accuracy by an independent diagnostic check. The wake up diagnostic feature allows the controller to monitor long term events without remaining powered up for the duration of the event, which would cause excessive battery drain. Notably, this feature is self-contained and, therefore, it eliminates the complexity of inter-module communication to have one module wake up another module.

The methodology described herein collects wake up requests from onboard vehicle subsystems, ECUs, and/or processing tasks, and handles the requests during a controller shutdown procedure to set the next wake up time for the controller. During the controller shutdown procedure, the closest (in time) requested wake up time is given priority, and other wake up requests are queued in the event that the highest priority wake up request is cancelled before shutdown occurs. While the controller is awake, timer information is analyzed to determine whether a programmed wake up time has passed. If so, then the next requested wake up time will become current. If a requested wake up time is within a predetermined, short amount of time (e.g., ten seconds), then the controller will not be allowed to shut down until after that wake up request has been serviced. This ensures that a race condition between shutting down and waking up due to the wake up time does not occur. If a wake up time is requested that exceeds the hardware capabilities of the wake up timer, then the longest possible wake up time that the hardware can manage will be set, such that the process requesting the longer wake up time can run and request a new wake up time that includes the remainder of the originally requested time. This allows the controller to wake up at the correct time, although it will experience one or more intervening wake ups to reset the wake up timer.

Each time the controller wakes up due to the wake up timer, a log of the requested wake up timer value, the actual wake up timer value, and its error status are recorded in nonvolatile memory. When the controller wakes up due to an external event (e.g., turning on the ignition, or when another module wakes up the controller), the log entries are parsed. Each entry is checked to determine if the actual wake up time is within a designated window of the requested wake up time. If not, then a diagnostic trouble code is set indicating that an "unexpected wake up" occurred. Moreover, on an external wake up event, the diagnostic checks to determine if a wake up time was requested, if a wake up time has passed, and if a wake up event was not logged in the wake up history. If this criteria is met, then a diagnostic trouble code indicating "wake up not detected" is set. If all of the logged wake ups are within the prescribed window, then a "Pass" is recorded for the "unexpected wake up" code. If no unserviced wake up events exist and timer wake ups were correctly serviced (as determined by the unexpected wake up diagnostic), then a "Pass" is recorded for the "wake up not detected" code.

Figure 3:
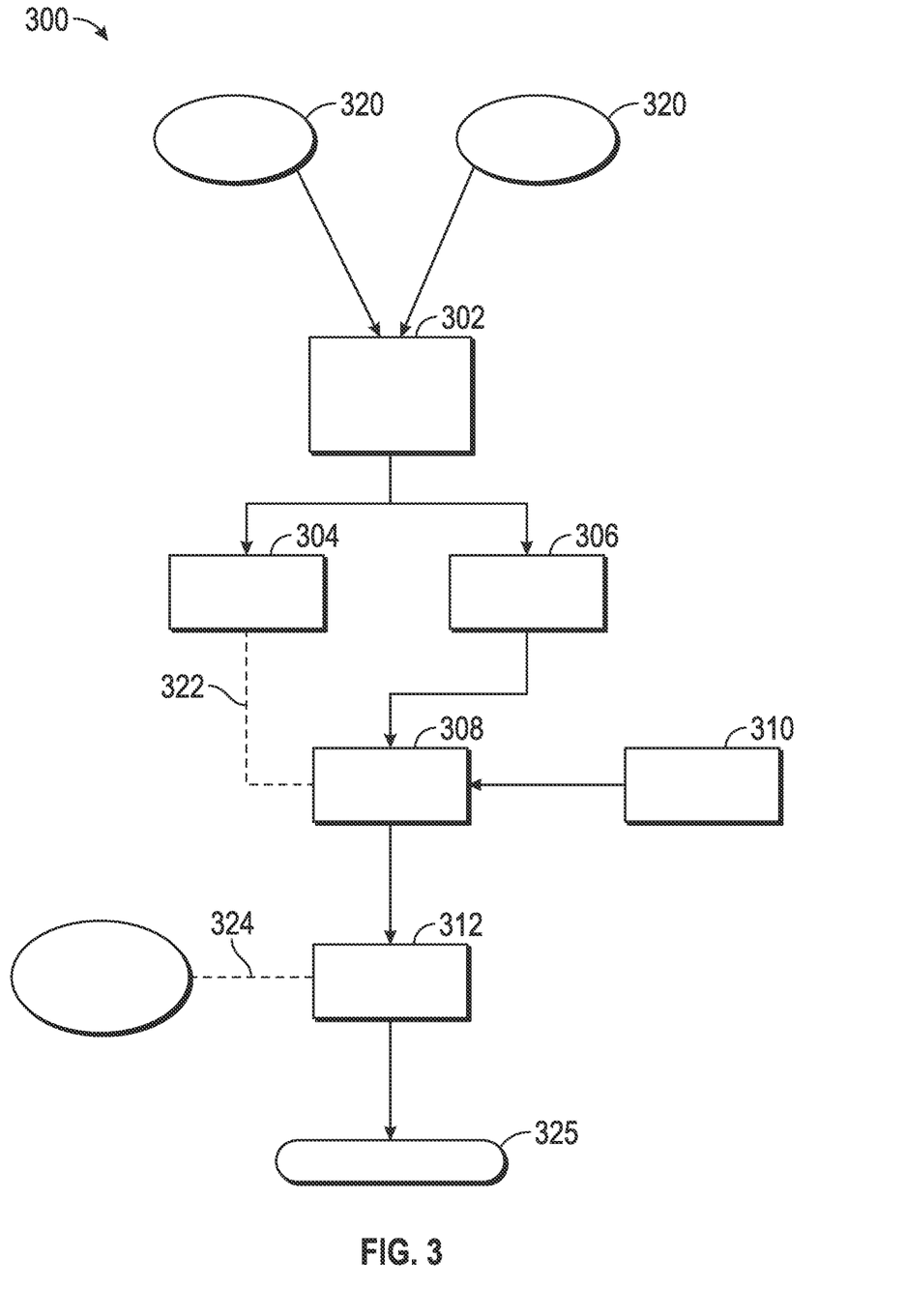
FIG. 3 is a block diagram that illustrates an exemplary embodiment of a wake up control and diagnosis operation.

FIG. 3 is a block diagram that illustrates an exemplary embodiment of a wake up control and diagnosis operation, which may be performed by an ECU 300 of a host vehicle. As one non-limiting example, FIG. 3 may be associated with the operation of an engine control module of an automobile. The blocks depicted in FIG. 3 may be realized as hardware devices or components, logical processing modules, software-implemented processes, or the like. FIG. 3 shows individual blocks for ease of description and clarity.

The illustrated embodiment of the ECU 300 may include, without limitation: a wake up request manager 302; a wake up timer 304; nonvolatile memory 306; a wake up logging module 308; a timer diagnostics module 310; and a wake up diagnostics module 312. These elements and modules cooperate as needed to support the various tasks, methods, and processes described in more detail below with reference to FIGS. 4-7.

The wake up request manager 302 represents a logical processing module that is executed or enabled when the controller of the ECU 300 is in the active powered-up state. In this regard, the wake up request manager 302 may be considered to be a functional module of the controller. The wake up request manager 302 is suitably configured to receive wake up requests 320 issued by other ECUs, software tasks, routines, and/or subsystems onboard the host vehicle, and handle the received wake up requests 320 as needed. A wake up request indicates that the requesting routine, process, task, or component (i.e., the "requestor") would like to have the controller of the ECU 300 wake up at a designated time (or times) for some reason. As one non-limiting example, the electrical subsystem of the vehicle may issue a wake up request to wake up the controller for purposes of testing the battery state at a designated time after the vehicle is shut down. To this end, it may be desirable to test the battery state one, two, four, and eight hours after the engine is shut down. As another non-limiting example, the fuel subsystem of the vehicle may issue another wake up request to wake up the controller for purposes of testing the fuel tank state. In this regard, it may be desirable to check the fuel tank state five, seven, and nine hours after the engine is shut down; wake up requests can be used to activate the controller of the ECU 300 at these times.

As described in more detail below, the wake up request manager 302 performs certain tasks and processes immediately prior to shut down (power-down) of the controller in the ECU 300. For example, the wake up request manager 302 timestamps each received wake up request 320, determines which wake up request 320 to consider as the priority request, and sets the next requested wake up time based on the chosen wake up request 320 and additional requirements associated with the wake up timer 304. The wake up request manager 302 may also consider unserviced wake up requests when setting the next wake up time. After determining what the next wake up time will be, the wake up request manager 302 cooperates with the wake up timer 304 in an appropriate manner to configure the wake up timer 304 with the next wake up time setting. The wake up request manager 302 also saves wake up request information in the nonvolatile memory 306. This enables the ECU 300 to preserve data associated with the wake up request after the controller is powered down. In certain embodiments, the nonvolatile memory 306 stores at least the following information, without limitation: the wake up timer value that is programmed in the wake up timer 304; a current runtime value of the wake up timer 304; and an identifier associated with the requestor from which the wake up request originated (e.g., an address, a component name, or a code).

As mentioned above, the wake up timer 304 may be implemented as a distinct and separate hardware device, relative to the controller hardware. The wake up timer 304 maintains a running time count, which may be represented by a runtime value, a running clock value, or the like. In certain embodiments, the runtime value is reset whenever the vehicle state is not in the "Run" or "Cranking" mode, and it remains active regardless of the state (powered up or down) of the controller. In practice, the wake up time programmed into the wake up timer 304 is based on the runtime value. Accordingly, the currently set wake up time references a count state of the runtime value. Thus, when the wake up timer 304 reaches the set wake up time, it initiates a wake up procedure wherein operating power/voltage is applied to the controller hardware, which in turn causes the controller to transition to its powered up state.

The wake up logging module 308 may be implemented as a logical processing module that is executed or enabled when the wake up timer 304 activates the controller of the ECU 300. In this regard, the wake up logging module 308 may be considered to be a functional module of the controller. The dashed line 322 in FIG. 3 schematically indicates that the wake up logging module 308 responds to the wake up timer 304 reaching the set wake up time. In this context, the wake up timer 304 may serve as an activation trigger for the wake up logging module 308. When active, the wake up logging module 308 obtains the most recent wake up request information that is stored in the nonvolatile memory 306, and populates a wakeup history data array with a new entry that includes the obtained information. The wake up logging module 308 also adds the actual wake up timer value to the new entry to keep track of when the controller actually woke up. In certain embodiments, the wake up logging module 308 communicates with the timer diagnostics module 310 to obtain diagnostic information related to the operating status of the wake up timer 304. Accordingly, each entry in the wake up history array includes at least the following information, without limitation: a wakeup request that was set; the corresponding programmed wake up time setting; the corresponding actual wake up time obtained from the wake up timer 304; and diagnostic timer information that indicates whether the wake up timer 304 was valid or invalid at the time the entry was made.

The wake up logging module 308 maintains the wake up history array while the vehicle remains in the inactive state (i.e., until the vehicle is turned on again). This allows the wake up logging module 308 to update the wake up history array each time the wake up timer 304 causes the controller to wake up during the inactive state of the vehicle. Thus, each time the controller wakes up in response to a set wake up time, the wakeup logging module adds a new entry to the history array.

As mentioned briefly above, the timer diagnostics module 310 generates and provides diagnostic timer information that indicates whether or not the wake up timer 304 is operating in a valid and accurate state. In this regard, the timer diagnostics module 310 may be implemented as a logical processing module that is executed or enabled when the controller of the ECU 300 is awake. In certain embodiments, the timer diagnostics module 310 independently checks the operation and validity of the wake up timer 304 and generates a flag or an output that indicates whether the wake up timer 304 is valid or invalid.

The wake up diagnostics module 312 may be implemented as a logical processing module that is executed or enabled when a power on state of the vehicle causes the controller of the ECU 300 to wake up. The dashed line 324 in FIG. 3 represents the vehicle power on condition, which in turn activates the wake up diagnostics module 312. The wake up diagnostics module 312 analyzes the wake up history array that was maintained during the immediately preceding power off state of the vehicle. The wake up diagnostics module 312 reviews the logged wake up history data to determine whether the requested wake up times correspond (within reason) to the actual wake up times, and to check that the controller actually woke up as scheduled. The wake up diagnostics module 312 also checks whether the controller accidentally woke up on its own, i.e., in the absence of a corresponding wake up request. The wake up diagnostics module 312 may also check whether the wake up timer still has a programmed wake up time that has not been serviced yet. If so, the wake up diagnostics module 312 determines whether the set wake up time has already passed (i.e., whether the last scheduled wake up time was erroneously skipped).

The wake up diagnostics module 312 is suitably configured to generate diagnostic trouble codes 326 that indicate the validity of the wake up feature. In certain embodiments, the wake up diagnostics module 312 generates a "Pass" if the wake up history data is determined to be valid, and generates a "Fail" if the wake up history data indicates a problem. Thus, a "Pass" or a "Fail" is generated each time the vehicle is turned on (i.e., the engine starts) and there have been preceding timer wake ups, wherein the code indicates the validity of the controller wake up feature based on the wake up history data that was collected during the immediately preceding inactive state of the vehicle.

Figure 4:
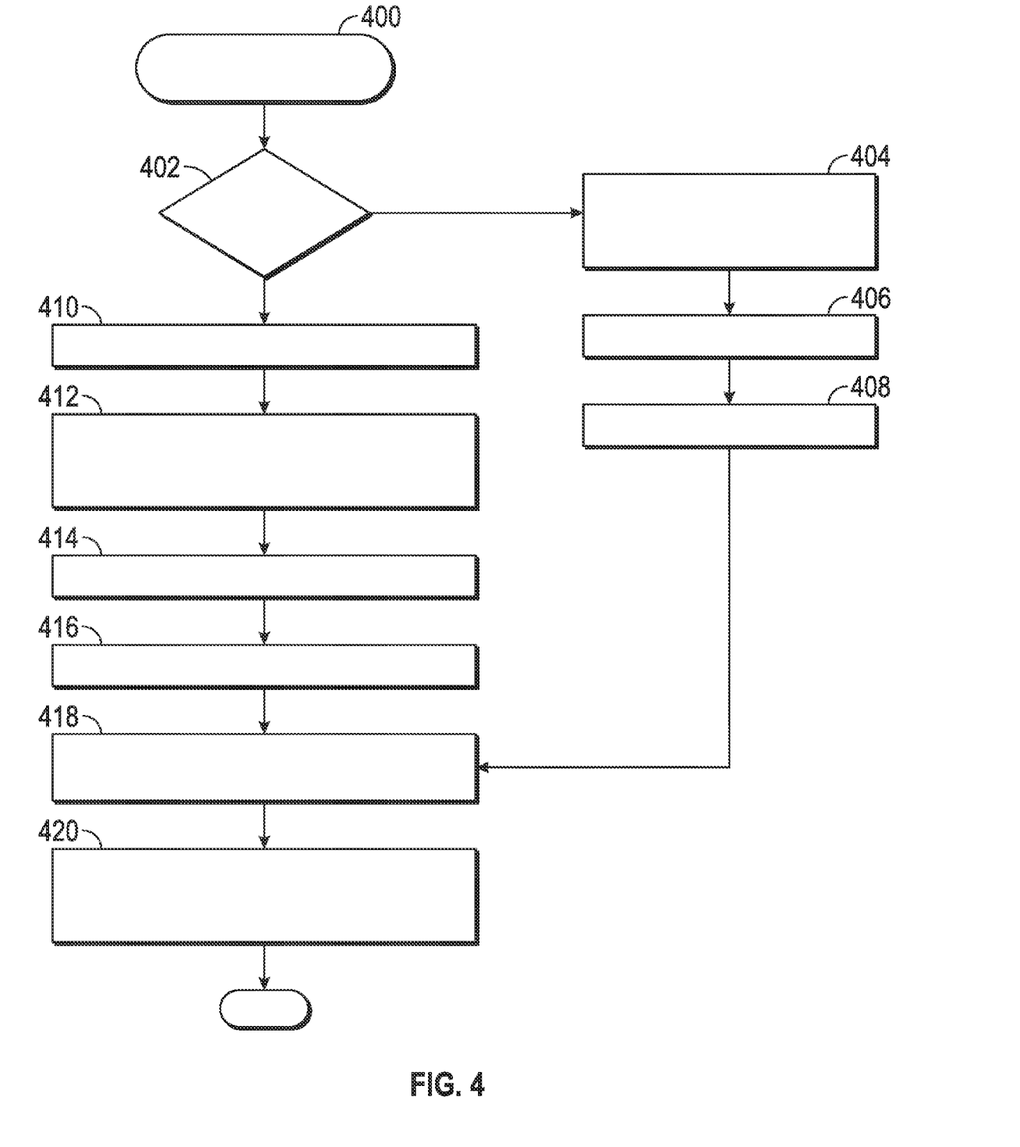
FIG. 4 is a flow chart that illustrates an exemplary embodiment of a wake up timer setting process.

FIG. 4 is a flow chart that illustrates an exemplary embodiment of a wake up timer setting process 400, which may be associated with the operation of the wake up request manager 302. The various tasks performed in connection with a process described here may be performed by software, hardware, firmware, or any combination thereof. For illustrative purposes, the description of a process may refer to elements mentioned above in connection with FIGS. 1-3. In practice, portions of a described process may be performed by different elements of the described system, e.g., the wake up request manager 302, the wake up timer 304, the wake up logging module 308, or the wake up diagnostics module 312. It should be appreciated that a described process may include any number of additional or alternative tasks, the tasks shown in the figures need not be performed in the illustrated order, and a described process may be incorporated into a more comprehensive procedure or process having additional functionality not described in detail herein. Moreover, one or more of the tasks shown in a figure could be omitted from an embodiment of the illustrated process as long as the intended overall functionality remains intact.

As mentioned above, the wake up request manager 302 handles wake up requests and programs the wake up timer 304 with the next wake up time. Accordingly, the process 400 can be performed during the shutdown procedure for the controller of the ECU. In this regard, the process 400 is completed while the controller remains active. The illustrated embodiment of the process 400 checks whether at least one wake up request has been received (query task 402). If not (the "No" branch of query task 402), then the process 400 sets the next wake up time to be equal to zero or to any designated "disable" value to indicate that a wake up time will not be programmed (task 404). The process 400 also sets a "Wake_Up_Set" variable to "False" (task 406) and sets a "Wake_Up_ID" variable to a null value (task 408). The "Null ID" value can be any value that is interpreted to mean that no wake up request has been issued by a requestor. After setting these two values, the process 400 proceeds to task 418, which is described in more detail below.

If one or more wake up requests have been received (the "Yes" branch of query task 402), then the process 400 continues by retrieving the current runtime value of the wake up timer (task 410). As explained previously, the runtime value indicates how much time has passed since the vehicle was shut down, regardless of when the controller is actually powered down. Thus, there may be a time offset between vehicle shut down and controller power down. For example, if the vehicle is parked with the stereo running for twenty minutes before complete power down, then the current runtime value of the wake up timer will indicate a running time of about twenty minutes. As another example, if the engine and other systems are completely shut down at about the same time, then the current runtime value of the wake up timer will indicate a running time that is close to an initial value, such as zero.

Next, the process 400 calculates or otherwise determines the next wake up time setting for programming the wake up timer (task 412). The next wake up time is determined based on the current runtime value, the requested wake up time(s) indicated by the received wake up requests, and other factors related to practical limitations of the wake up timer hardware, as described in more detail below. The process 400 sets the "Wake_Up_Set" variable to "True" (task 414) and sets the "Wake_Up_ID" variable to a value that identifies the requestor (task 416). In certain implementations, the "Wake_Up_ID" variable is set to indicate an address, a username, or an code that is assigned to the requestor.

The process 400 continues by configuring the wake up timer with the next wake up time (task 418). In addition, the process 400 stores the relevant wake up request information in the nonvolatile memory (task 420). As mentioned above, the stored information can be used in connection with the operation of the wake up diagnostics module. At the completion of the process 400, the controller can be powered down and put to sleep.

Referring again to task 412, the process 400 may consider various factors when determining what the next wake up time will be. If there is only one wake up request to consider, then the process 400 continues to handle the request as described below. If, however, there are multiple wake up requests to consider (e.g., new requests, unserviced requests, pending requests, etc.), then the process 400 selects the request having the shortest wake up time. This ensures that the controller will wake up to service the next wake up request. Accordingly, if the process 400 receives a first request for a wake up in two hours and a second request for a wake up in five hours, then it will select the first request for further handling. Moreover, the process 400 may use the timestamp of the second request to keep track of the "residual" amount of wake up time such that the originally requested wake up (five hours) is still serviced. Thus, when the controller is awake, it may need to refresh the wake up time associated with any unserviced or pending requests, in addition to handling any newly received wake up requests.

In certain embodiments, the wake up time associated with the selected wake up request is compared to a threshold time, which is intended to prevent a race condition where a requested wake up time is programmed to occur while the controller is still awake, while the controller is transitioning to the inactive state, or immediately after the controller shuts down. Such race conditions may result in a missed wake up time. To address these scenarios, the minimum time period is used to set the wake up timer whenever the requested wake up time is less than the minimum time period. The threshold time period is long enough to prevent the type of timing conflicts mentioned above. In certain embodiments, the minimum time period may be 10 seconds, 30 seconds, 60 seconds, or the like. It should be appreciated that the threshold time period may vary to suit the needs of the particular embodiment and intended application.

If the wake up time defined by the selected wake up request is greater than or equal to the threshold time period, then the process 400 retains the defined wake up time and continues in the manner described below. If the wake up time defined by the selected wake up request is less than the threshold time period, then the process 400 uses a minimum time for the next wake up time setting, and proceeds as described below. In certain embodiments, the threshold time is equal to the minimum time. In other embodiments, different time values could be used for the threshold time and the minimum time.

The process 400 may also check the requested wake up time against a maximum time, which is associated with the counting capacity of the wake up timer hardware. For example, the wake up timer may be designed to count up to a maximum timer value (e.g., 72 hours). Thus, if the wake up request calls for a wake up time after 80 hours, the wake up timer would not be able to directly accommodate the request. Accordingly, if the wake up time defined by the selected wake up request is greater than or equal to a threshold time, then the process 400 uses the maximum timer value instead of the requested wake up time. If the wake up time defined by the selected wake up request is less than the threshold time, then the process 400 retains the defined wake up time and programs the wake up timer as needed. In certain embodiments, the maximum threshold time is equal to the maximum timer value of the wake up timer. In other embodiments, the maximum time value may be different than the maximum timer value of the wake up timer.

As explained above, the wake up timer may begin counting when the engine/ignition of the vehicle is turned off. In alternative embodiments, however, the wake up timer control mechanism may be flexibly configured such that it can begin counting at a time following engine/ignition shut down. It should be appreciated that the methodology described below may be modified as needed for use with different wake up timing schemes if so desired. Assuming (for this particular example) that the wake up time starts when the engine/ignition is turned off, the controller need not be shut down concurrently with the engine or ignition. Instead, the controller could remain active for an indeterminate amount of time after the engine is shut down. For example, the driver may remain in a parked vehicle listening to the radio, using the onboard telecommunication system, using a telematics system, using a navigation system, or the like. Accordingly, the process 400 may analyze and program relative wake up times that contemplate any elapsed time that has been recorded between engine shut down and the controller power down procedure. Assume, for example, that the wake up request designates a wake up time of 60 minutes after engine shut down, and that the controller remains active for 10 minutes after engine shut down. If the requested wake up time is not subjected to any other adjustments, then the wake up timer will be programmed to wake up in 50 minutes. This form of timing offset ensures that wake up requests are serviced in the expected manner regardless of when the controller is actually powered down.

Figure 5:
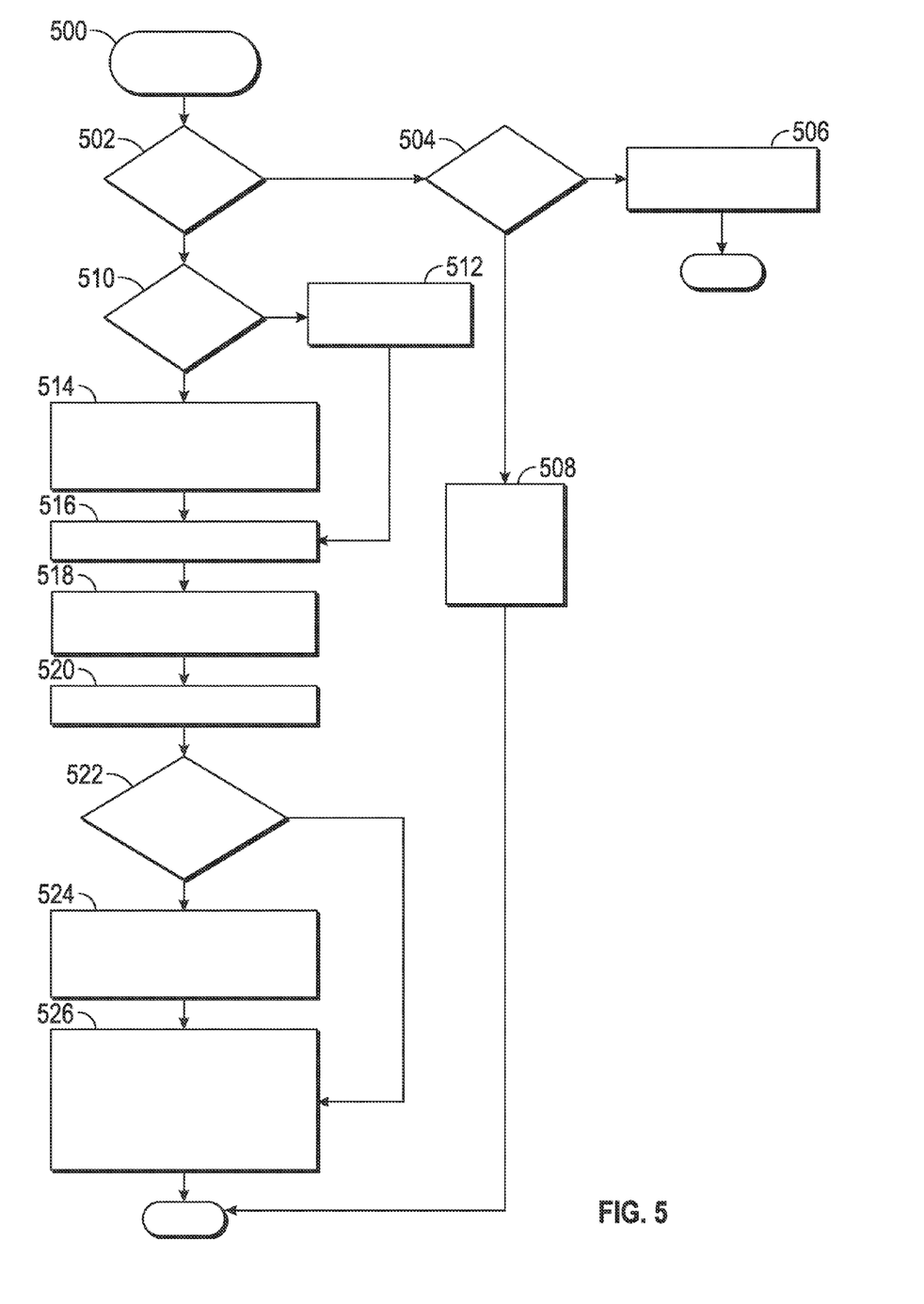
FIG. 5 is a flow chart that illustrates an exemplary embodiment of a wake up logging process.

FIG. 5 is a flow chart that illustrates an exemplary embodiment of a wake up logging process 500. The process 500 is performed while the controller is in an active state, and after the ECU has performed at least one wake up event during the previous inactive shutdown state of the vehicle. In certain embodiments, the process 500 is performed during controller initialization, which occurs after the controller wakes up. Accordingly, an iteration of the process 500 is performed for each wake up event.

The process 500 may begin by checking whether the current wake up event was initiated by the wake up timer (query task 502). For this example, query task 502 checks status registers of the processor that indicate the reset source that caused the processor to being executing. A timer wake up is identified through these registers and is independent of whether a wake up was actually requested. If the current wake up event was not initiated by the wake up timer, then the process 500 checks whether the current wake up event corresponds to a power up reset (query task 504). In this regard, a power up reset occurs when the ignition is turned on, when the engine starts, when a serial data message arrives, or the like. Moreover, some vehicles perform a power up reset when a door of the vehicle is opened. If a power up reset has occurred (the "Yes" branch of query task 504), then the process 500 performs wake up diagnostics (task 506) to check the performance of the timer-based wake up feature. Exemplary wake up diagnostics are described in more detail below with reference to FIG. 6 and FIG. 7.

If query task 504 determines that a power up reset has not occurred, then the last requested wake up time is cleared (task 508) and the process 500 ends. This scenario corresponds to a "running reset" condition, which may occur if an error was detected in memory, or if an illegal interrupt occurred in the microprocessor, or if the software became corrupted for some reason. In such cases, the controller is not operating properly, and the wake up timer cannot be diagnosed. Thus, the wake up time is cleared and the process 500 ends without performing diagnostics on the wake up timer.

The "Yes" branch of query task 502 indicates that the wake up event was caused by the wake up timer. As a result, the process 500 determines whether the wake up event is the first event to log into the wake up history array (query task 510). If so, then the wake up history array is cleared (task 512) to prepare it for population with new entries. If not (the "No" branch of query task 510), then the wake up history array is shifted or otherwise manipulated to accommodate a new entry corresponding to the current wake up event (task 514). In addition, the process 500 increments a count (task 516) that represents the number of times the controller was subjected to a timer-based wake up during the last inactive period of the vehicle. For this example, the count is incremented once per timer-based wake up event. Alternatively, the count may be adjusted in accordance with any predetermined scheme if so desired.

The process 500 may read or otherwise obtain timer diagnostics results (task 518) that indicate the validity or invalidity of the wake up timer. As mentioned above with reference to the timer diagnostics module 310 (see FIG. 3), the ECU may check the validity of the wake up timer using an independent process. Task 518 described here obtains the output of the timer diagnostics module 310. In certain embodiments, the output of the timer diagnostics module 310 may be a code, a flag, or any suitably formatted data that indicates whether the wake up timer is valid (accurate) or invalid (inaccurate or in an error condition). The process 500 also reads or otherwise obtains the actual wake up timer value, which represents the current runtime value of the wake up timer (task 520).

The process 500 may continue by checking whether a wake up time was set during the last controller shut down (query task 522). If so, then the requested (set) wake up time is stored in the new entry of the wake up history array (task 524). Additional information may be written to the new entry, including, without limitation: the actual wake up time obtained from the wake up timer at task 520; the timer diagnostics results read at task 518; and the value of the "Wake_Up_ID" variable that identifies the requestor of the wake up request (task 526). If a wake up time was not set during the last controller shut down (the "No" branch of query task 522), then task 524 is skipped and the new entry will not include a set wake up time. The "No" branch of query task 522 indicates a scenario that indicates a malfunction in the wake up timer hardware. It is conceivable that a fault is created that causes the wake up timer to wake up the processor sporadically, even when not requested to do so. In such cases, the reset source would point to a timer wake up, but the data stored in the nonvolatile memory would indicate that no wake up was actually requested. Tasks 524 and 526 correspond to an operation that logs the respective wake up information while the controller is awake. The content of the wake up history array may be considered to be a collection of logged wake up information.

Figure 6:
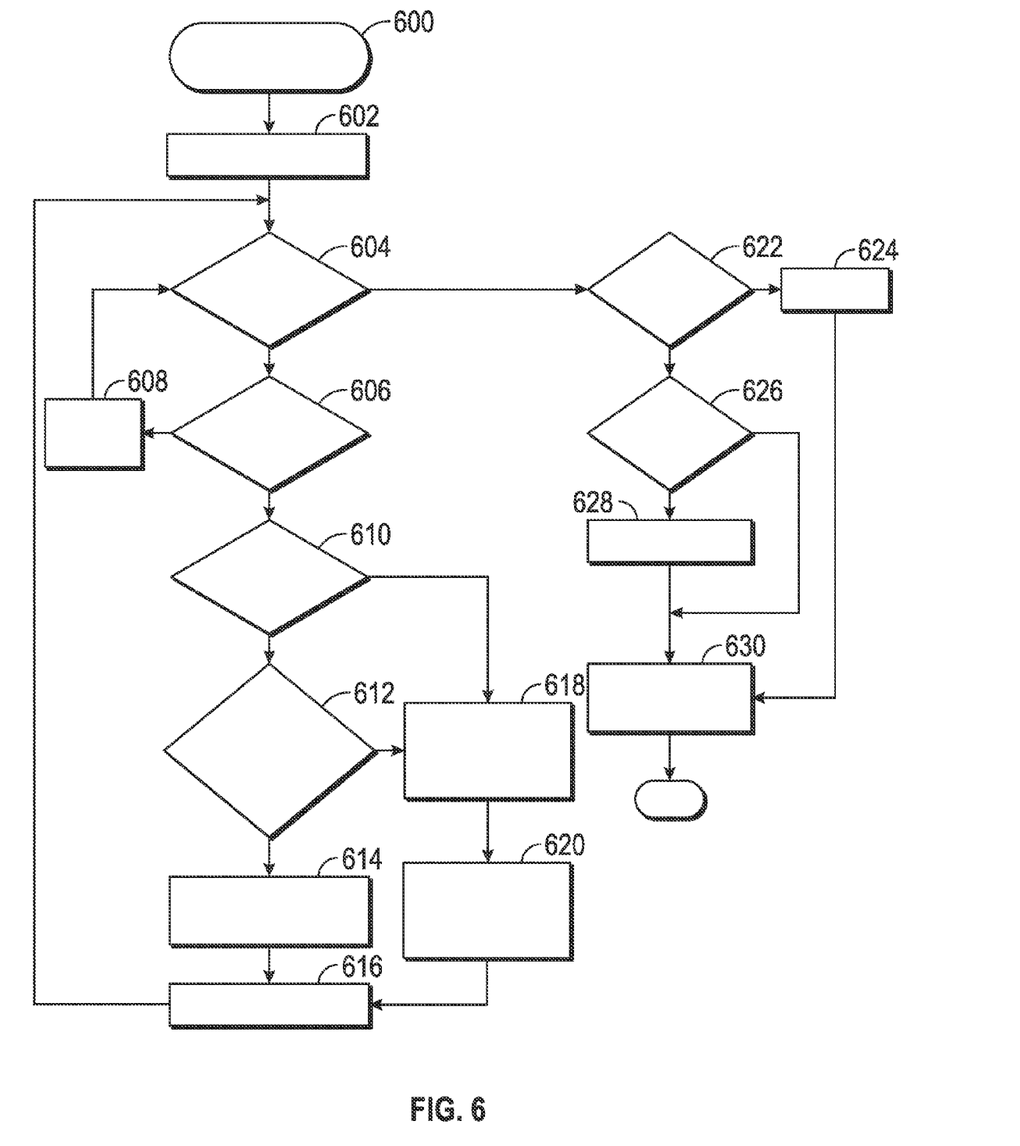
FIG. 6 is a flow chart that illustrates an exemplary embodiment of a process for detecting an unexpected wake up event.

FIG. 6 is a flow chart that illustrates an exemplary embodiment of a process 600 for detecting an unexpected wake up. The process 600 represents one of the wake up diagnostics performed during task 506 (see FIG. 5). This description assumes that the diagnostic corresponding to the process 600 is enabled and that the wake up timer has not failed for any other reason. The process 600 involves the analyzing of the logged wake up information during an active operating state of the vehicle, to obtain a wake up diagnosis. Accordingly, the illustrated embodiment of the process 600 begins by initializing the index of the wake up history array to a starting value, such as zero (task 602). The index allows the process 600 to determine when the end of the array has been reached (by comparing the index value against the count maintained at task 516 of the process 500; see FIG. 5). In this regard, the process 600 checks whether the end of the wake up history array has been reached (query task 604). If so, the process 600 leads to a query task 622 (this flow path is described in more detail below).

The main loop that begins at query task 604 is performed once for each entry in the wake up history array. Thus, if the end of the array has not been reached (the "No" branch of query task 604), the process 600 continues by checking the results of the timer diagnostics for the entry under analysis (query task 606). If the results of the timer diagnostics indicate that the wake up timer has failed or is invalid (the "No" branch of query task 606), then further analysis of the current entry is halted, the index is incremented (task 608), and the process 600 returns to query task 604.

The "Yes" branch of query task 606 is followed when the timer diagnostics indicate that the wake up timer was valid for the entry under analysis. In this regard, the process 600 checks whether the requested (or set) wake up time is equal to zero (query task 610). In this context, a wake up time of zero is indicative of the "Wake_Up_Set" variable equal to "False" (see above description of the process 400). A wake up time of zero indicates that no wake up time has been set; zero is a default initialization value in this context. Thus, if there was actually a timer-induced wake up event with a set wake up time of zero, then the current event under analysis may be indicative of an unexpected wake up.

The "No" branch of query task 610 indicates that the programmed wake up time is not equal to zero. At this point, the process 600 compares the actual wake up time recorded from the wake up timer against the programmed wake up time (query task 612). For this example, query task 612 checks whether the actual wake up time is within a designated window of time relative to the set wake up time. The window of time represents an allowable tolerance, such as five seconds, that still results in a "match" for purposes of query task 612. If the actual wake up time "matches" the set wake up time (the "Yes" branch of query task 612), then the process 600 increments an "Unexpected Wake Up Pass" count (task 614), increments the index (task 616), and returns to query task 604 to perform the next iteration of the main processing loop. The "Unexpected Wake Up Pass" count represents a running count of how many entries in the wake up history array pass the "Unexpected Wake Up" diagnostic. Ideally, each entry will pass this diagnostic and the "Unexpected Wake Up Pass" count will equal the number of entries in the array.

Referring back to query task 610, if the programmed wake up time is equal to zero (the "Yes" branch of query task 610), then the process 600 increments an "Unexpected Wake Up Fail" count (task 618). The "Unexpected Wake Up Fail" count represents a running count of how many entries in the wake up history array fail the "Unexpected Wake Up" diagnostic, i.e., how many times the controller woke up unexpectedly. Note that task 618 is also performed when the actual wake up time does not "match" the programmed requested wake up time (the "No" branch of query task 612). In either scenario, the process 600 assumes that the controller woke up in error. In addition to incrementing the "Unexpected Wake Up Fail" count, the process 600 captures the requested and actual wake up times for purposes of keeping a failure record (task 620). After capturing the requested and actual wake up times, the process 600 continues to task 616 to increment the index, and then returns to query task 604 for the next iteration.

If the end of the wake up history array has been reached (the "Yes" branch of query task 604), then the process 600 checks the status of the "Unexpected Wake Up Fail" count. In this regard, if the "Unexpected Wake Up Fail" count is greater than a threshold value, such as zero (the "Yes" branch of query task 622), then the process 600 reports a "Fail" output for the "Unexpected Wake Up" diagnostic. The "Fail" output may also include the "Unexpected Wake Up Fail" count to identify which entries contributed to the count, or the like.

If the "Unexpected Wake Up Fail" count is less than or equal to the threshold number (the "No" branch of query task 622), the process 600 checks the number of wake up events recorded in the wake up history array (query task 626). In this context, the number of wake up events corresponds to the count maintained during the process 500 (see the above description of task 516). If the wake up count is greater than zero (the "Yes" branch of query task 626), the process 600 reports a "Pass" output for the "Unexpected Wake Up" diagnostic. Query task 626 is utilized to ensure that a "Pass" output is not generated unless at least one successful wake up event has been recorded. Accordingly, if the wake up count is less than or equal to zero (the "No" branch of query task 626), then the process 600 continues without reporting a "Pass" output.

Eventually, the process 600 clears the wake up count (task 630). Task 630 is performed after reporting a "Pass" output (task 628), after reporting a "Fail" output (task 624), or when the wake up count is less than or equal to zero (the "No" branch of query task 626). The wake up count is cleared at this point because the process 600 has already considered all of the entries in the wake up history array (as implicated by the "Yes" branch of query task 604), and to prepare the array for new entries. After clearing the wake up count, the process 600 ends.

Figure 7:
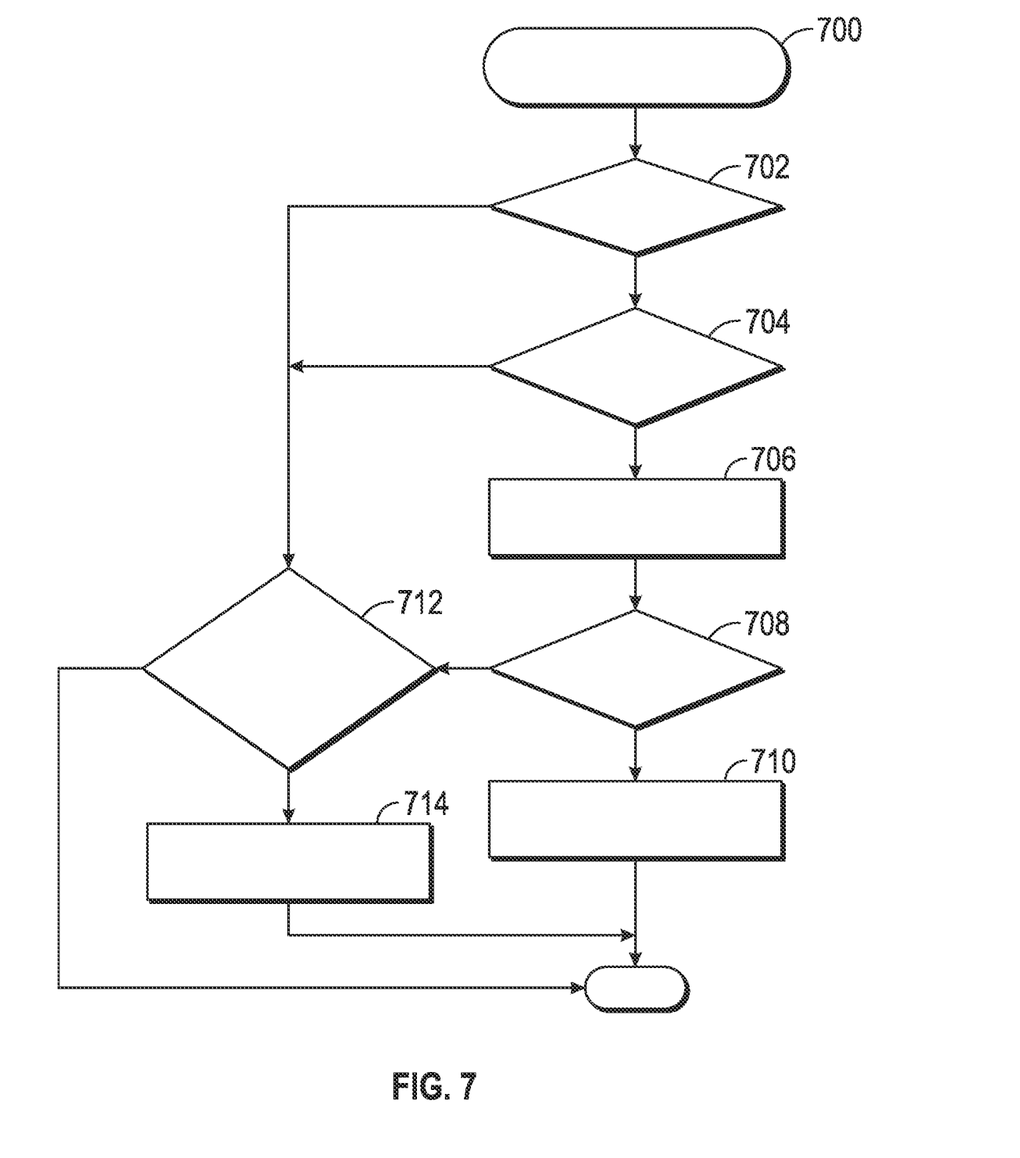
FIG. 7 is a flow chart that illustrates an exemplary embodiment of a process for detecting a missed wake up.

FIG. 7 is a flow chart that illustrates an exemplary embodiment of a process 700 for detecting a missed wake up that has been scheduled in the wake up timer. The process 700 represents another one of the wake up diagnostics performed during task 506 (see FIG. 5). This description assumes that the diagnostic corresponding to the process 700 is enabled and that the wake up timer has not failed for any other reason. The illustrated embodiment of the process 700 begins by checking whether the originally requested wake up time is greater than zero (query task 702). If the requested wake up time is greater than zero (the "Yes" branch of query task 702), then the process 700 continues by checking the results of the timer diagnostics for the entry under analysis (query task 704). If the results of the timer diagnostics indicate that the wake up timer is valid (the "Yes" branch of query task 704), then the process 700 reads or otherwise obtains the actual wake up timer value (task 706) and compares the actual wake up timer value to the requested wake up time (query task 708).

If the actual wake up timer value is greater than or equal to the requested wake up time (the "Yes" branch of query task 708), then the process 700 reports a "Fail" output for the "Wake Up Not Detected" diagnostic (task 710). This scenario indicates that the wake up timer continued past the requested wake up time without actually waking up the controller. In other words, a scheduled wake up time was missed for some reason.

If the requested wake up time is less than or equal to zero (the "No" branch of query task 702), or if the timer diagnostics indicates that the wake up timer is invalid (the "No" branch of query task 704), or if the actual wake up timer value is less than the requested wake up time (the "No" branch of query task 708), then the process 700 checks the "Unexpected Wake Up Pass" count (query task 712). Notably, query task 712 leverages the "Unexpected Wake Up Pass" count that is maintained by the process 600. In this regard, query task 712 checks whether the "Unexpected Wake Up Pass" count is greater than zero. If so, then the process 700 reports a "Pass" output for the "Wake Up Not Detected" diagnostic (task 714). If, however, the "Unexpected Wake Up Pass" count is less than or equal to zero (the "No" branch of query task 712), then the process 700 ends without reporting a "Pass" or a "Fail" for the "Wake Up Not Detected" diagnostic. Query task 712 is performed to prevent the process 700 from reporting a "Pass" unless at least one scheduled wake up was successfully performed and documented.

Referring back to task 506 of the process 500 (FIG. 5), the wake up diagnostics (e.g., process 600 and process 700) are performed whenever the vehicle is powered on and placed into the active operating state. Thus, the wake up diagnostics are performed for the wake up events that were scheduled and executed during the immediately preceding inactive state. The various "Pass" and "Fail" outputs (e.g., diagnostic trouble codes) are issued while the vehicle is operating in the active state, such that any desired corrective action can be taken at that time.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A control and diagnosis method for an electronic control module of a vehicle, the electronic control module comprising a processor and a wake up timer for the processor, the method comprising:
   performing, during an inactive shutdown state of the vehicle, at least one wake up event for the processor of the electronic control module, the at least one wake up event being initiated by the wake up timer of the electronic control module;
   logging, during the inactive shutdown state of the vehicle, wake up information associated with the at least one wake up event to obtain logged wake up information, the logged wake up information comprising, for each wake up event, an identifier associated with a requestor from which the wake up request originated, a requested wake up time programmed for the wake up timer, and an actual wake up time corresponding to the requested wake up time as obtained from the wake up timer;
   analyzing the logged wake up information during an active operating state of the vehicle to obtain a wake up diagnosis; and
   generating, during the active operating state of the vehicle, an output indicative of the wake up diagnosis.

2. The method of claim 1, wherein:
   the inactive shutdown state of the vehicle corresponds to an ignition off state; and
   the active operating state of the vehicle corresponds to an ignition on state.

3. The method of claim 1, wherein analyzing the logged wake up information comprises:
   determining whether an unexpected wake up event occurred during the inactive shutdown state of the vehicle.

4. The method of claim 1, wherein analyzing the logged wake up information comprises:
   determining whether a requested wake up time was missed during the inactive shutdown state of the vehicle.

5. The method of claim 1, wherein generating the output comprises:
   generating a first diagnostic code when the analyzing results in a passing wake up diagnosis; and
   generating a second diagnostic code when the analyzing results in a failing wake up diagnosis.

6. An electronic control module for a vehicle, comprising:
   a processor;
   a wake up timer operatively associated with the processor; and
   a nonvolatile memory element configured to store wake up request information associated with wake up requests managed by the processor, wherein the processor, the wake up timer, and the nonvolatile memory element cooperate to:
   perform, during an inactive shutdown state of the vehicle, at least one wake up event for the processor, the at least one wake up event being initiated by the wake up timer;
   maintain, during the inactive shutdown state of the vehicle, a wake up history array comprising at least one entry associated with the at least one wake up event, each entry comprising wake up information associated with a respective wake up event, the wake up information comprising an identifier associated with a requestor from which the wake up request originated, a requested wake up time programmed for the wake up timer, and an actual wake up time corresponding to the requested wake up time as obtained from the wake up timer;
   analyze the wake up history array during an active operating state of the vehicle to obtain a wake up diagnosis; and
   generate, during the active operating state of the vehicle, an output indicative of the wake up diagnosis.

7. The electronic control module of claim 6, wherein analyzing the wake up history array comprises:
   determining whether an unexpected wake up event occurred during the inactive shutdown state of the vehicle.

8. The electronic control module of claim 6, wherein analyzing the wake up history array comprises:
   determining whether a requested wake up time was missed during the inactive shutdown state of the vehicle.

9. A control and diagnosis method for an electronic control module of a vehicle, the electronic control module comprising a processor and a wake up timer for the processor, the method comprising:
   operating the wake up timer during an inactive shutdown state of the vehicle to initiate wake up events for the processor;
   operating the processor during the wake up events to perform vehicle diagnostics, manage wake up requests, and log wake up information associated with the wake up events, the logged wake up information comprising, for each wake up event, an identifier associated with a requestor from which the wake up request originated, a requested wake up time programmed for the wake up timer, and an actual wake up time corresponding to the requested wake up time as obtained from the wake up timer;
   performing, during an active operating state of the vehicle that follows the inactive shutdown state of the vehicle, wake up diagnostics based on logged wake up information; and
   generating, during the active operating state of the vehicle, a result of the wake up diagnostics.

10. The method of claim 9, wherein:
    the inactive shutdown state of the vehicle corresponds to an engine off state; and
    the active operating state of the vehicle corresponds to an engine on state.

11. The method of claim 9, wherein performing wake up diagnostics comprises:
    determining whether an unexpected wake up event occurred during the inactive shutdown state of the vehicle.

12. The method of claim 9, wherein performing wake up diagnostics comprises:
    determining whether a requested wake up time was missed during the inactive shutdown state of the vehicle.

13. The method of claim 9, wherein performing wake up diagnostics comprises:
    determining whether at least one requested wake up time was successfully performed;
    determining whether a requested wake up time was missed during the inactive shutdown state of the vehicle;
    reporting a "Fail" output when it is determined that a requested wake up time was missed during the inactive shutdown state of the vehicle; and
    reporting a "Pass" output when it is determined that at least one requested wake up time was successfully performed and that a requested wake up time was not missed during the inactive shutdown state of the vehicle.

14. The method of claim 9, further comprising:
receiving a wake up request that indicates a requested wake up time for the processor;
determining a next wake up time setting for the wake up timer, based on the requested wake up time and a runtime value of the wake up timer; and
configuring the wake up timer with the next wake up time setting.

15. The method of claim 14, wherein determining the next wake up time setting comprises:
using a minimum time for the next wake up time setting when the requested wake up time is less than a threshold time.

16. The method of claim 15, wherein the threshold time equals the minimum time.

17. The method of claim 14, wherein determining the next wake up time setting comprises:
using a maximum time for the next wake up time setting when the requested wake up time is greater than a threshold time.

18. The method of claim 17, wherein the maximum time corresponds to a maximum timer value of the wake up timer.

\* \* \* \* \*